(12) United States Patent
Chang

(10) Patent No.: US 9,246,354 B2
(45) Date of Patent: Jan. 26, 2016

(54) ELECTRICITY STORAGE DEVICE FOR SOLAR ENERGY HARVESTING DEVICE

(71) Applicants: Yun-Shan Chang, San Jose, CA (US); Da-Wei Lin, New Taipei (TW)

(72) Inventor: Yun-Shan Chang, San Jose, CA (US)

(73) Assignees: Yun-Shan Chang, San Jose, CA (US); Da-Wei Lin, New Taipei (TW)

( * ) Notice: Subject to any disclaimer, the term of this patent is extended or adjusted under 35 U.S.C. 154(b) by 220 days.

(21) Appl. No.: 14/099,000

(22) Filed: Dec. 6, 2013

(65) Prior Publication Data

US 2015/0115866 A1 Apr. 30, 2015

(30) Foreign Application Priority Data

Oct. 28, 2013 (TW) .............................. 102138884 A

(51) Int. Cl.
| | |
|---|---|
| *H02J 7/00* | (2006.01) |
| *H01M 10/44* | (2006.01) |
| *H01M 10/46* | (2006.01) |
| *H02J 7/35* | (2006.01) |

(52) U.S. Cl.
CPC ................ *H02J 7/35* (2013.01); *H02J 7/0029* (2013.01); *H02J 2007/0039* (2013.01)

(58) Field of Classification Search
CPC ............ H02J 7/35; H02J 7/355; Y02E 60/12; H01M 10/465; H01M 16/006

USPC ......................................................... 320/101
See application file for complete search history.

(56) References Cited

U.S. PATENT DOCUMENTS

| | | | |
|---|---|---|---|
| 5,477,091 A | 12/1995 | Fiorina et al. | |
| 6,262,558 B1 * | 7/2001 | Weinberg ............... | B65G 1/428 136/291 |

(Continued)

FOREIGN PATENT DOCUMENTS

| | | |
|---|---|---|
| TW | M438026 U | 9/2012 |
| TW | M461558 U | 9/2013 |
| WO | 2009/046533 A1 | 4/2009 |

*Primary Examiner* — Arun Williams
(74) *Attorney, Agent, or Firm* — Rosenberg, Klein & Lee

(57) ABSTRACT

An electricity storage device for a solar energy harvesting device comprising at least a first electricity storage unit, at least a second electricity storage unit, a battery monitoring unit and a power converter. The second electricity storage unit is for coupled to an exterior power supply system which charges/discharges the second electricity storage unit in a predetermined voltage. The battery monitoring unit controls the power converter according to the output voltage of the first electricity storage unit for converting the electricity of the first electricity storage unit to the second electricity unit. When the output voltage of the first electricity storage unit is larger than a start voltage, the electricity of the first electricity storage unit is converted to the second electricity storage unit. When the output voltage of the first electricity storage unit is less than a stop voltage, the battery monitoring unit disables the power converter.

10 Claims, 3 Drawing Sheets

(56) References Cited

U.S. PATENT DOCUMENTS

| | | | |
|---|---|---|---|
| 6,281,485 B1* | 8/2001 | Siri | G05F 1/67 126/601 |
| 2005/0006958 A1* | 1/2005 | Dubovsky | H02J 3/382 307/64 |
| 2006/0152200 A1* | 7/2006 | Kanai | H02J 7/35 323/222 |
| 2009/0001926 A1* | 1/2009 | Sato | B60L 3/0046 320/102 |
| 2009/0266397 A1* | 10/2009 | Gibson | H02S 40/38 136/244 |
| 2010/0181837 A1 | 7/2010 | Seeker et al. | |
| 2010/0231175 A1* | 9/2010 | Noda | H01M 10/44 320/162 |
| 2013/0106342 A1* | 5/2013 | Iwata | H02M 7/30 320/101 |
| 2013/0271062 A1* | 10/2013 | Lu | H02J 7/35 320/101 |

\* cited by examiner

ELECTRICITY STORAGE DEVICE FOR SOLAR ENERGY HARVESTING DEVICE

BACKGROUND OF THE INVENTION

1. Field of the Invention

The instant disclosure relates to a solar energy device; in particular, to an electricity storage device for a solar energy harvesting device.

2. Description of Related Art

The energy which is existed on earth falls into shortage yearly by yearly. Such as coal; petroleum; ethanol; nuclear energy; water energy; geo-thermal energy; wind energy; and renewable bio-energy etc., all encounter different drawbacks and difficult reasons on cost; safety; green; and productivity. Because of the usage and human population are increased rapidly, it is inevitable to have a clean; reliable; and cost effective energy for human being to utilize it daily. There are two candidates which can meet the previous criteria—nuclear fusion and solar energy. The nuclear fusion is good but it still cannot go to commercialize due to technical barrier, while solar is the very candidate to fulfill the determinate role on energy sources. Although solar energy harvesting is a feasible and reasonable energy source as compared to other existed candidates, there are some other issues to be breakthrough to make it become a mighty energy source. The issues are solar cells efficiency and photo-voltaic energy harvest/transfer efficiency. III-V compound cell with new quantum dot technology shows amazing efficiency over 70% photo-voltaic conversion but it can be only used on special applications due to its extraordinary fabrication cost. Currently commercial solar cell is silicon based with about up to 21% photo-voltaic conversion efficiency. Even there are some other type solar cells, for example organic polymer and II-VI compound are announced but the reliability; durability; and cost make it is unable to be a suitable candidate. Lately most of solar cell manufactures invest more and more on the improvement of silicon-based solar cells with light intensity collection; incident light recycling; multiple-path absorption, etc. So far, there is not a good photo-voltaic transfer design to accommodate the harvested solar energy transfer into stored voltaic energy and/or usable electric energy. Most of design needs to be under high light incidence to trigger the harvesting energy transfer, for example more than 30-50K Lux.

Currently solar energy harvesting is quite limited to storage and driving capability. The battery type of storage and driving has a contradiction between dual-way demands. For storage, the harvesting (charge) speed needs to be moderate to prolong the battery life and to reduce the storage cost, while driving capability is in the opposite demanding. To co-exist with current commercial battery types, for example USB or adaptor charge controlled battery, the direct energy transfer from solar energy harvesting is impossible due to restriction of charge voltage range values. Hence to use a simple harvesting and transfer boost and charge controller is not possible to meet the requirements of low-light solar energy harvesting and electric energy transfer.

SUMMARY OF THE INVENTION

The object of the instant disclosure is to provide an electricity storage device for a solar energy harvesting device, in order to store solar energy.

In order to achieve the aforementioned objects, according to an embodiment of the instant disclosure, an electricity storage device for a solar energy harvesting device is offered. The electricity storage device comprises at least a first electricity storage unit, at least a second electricity storage unit, a battery monitoring unit and a power converter. The first electricity storage unit receives and stores electricity from the solar energy harvesting device. The second electricity storage unit is for coupling to an exterior power supply system, wherein the exterior power supply system charges/discharges the second electricity storage unit in a predetermined voltage. The battery monitoring unit is coupled to the first electricity storage unit. The battery monitoring unit senses an output voltage of the first electricity storage unit, and generates a control signal according to the output voltage of the first electricity storage unit. The power converter has an input terminal and an output terminal. The input terminal is coupled to the first electricity storage unit, and the output terminal is coupled to the second electricity storage unit. The power converter is controlled by the control signal for converting the electricity of the first electricity storage unit to the second electricity storage unit. The battery monitoring unit enables the power converter through the control signal when the output voltage of the first electricity storage unit is larger than a start voltage, for controlling the power converter to convert the electricity of the first electricity storage unit to the second electricity storage unit. The battery monitoring unit disables the power converter through the control signal when the output voltage of the first electricity storage unit is less than a stop voltage, wherein the start voltage is larger than the stop voltage.

In summary, the electricity storage device for a solar energy harvesting device senses and determines the output voltage of first electricity storage unit, in order to control whether to charge the second electricity storage unit.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[An Embodiment of an Electricity Storage Device for a Solar Energy Harvesting Device]

Figure 1:
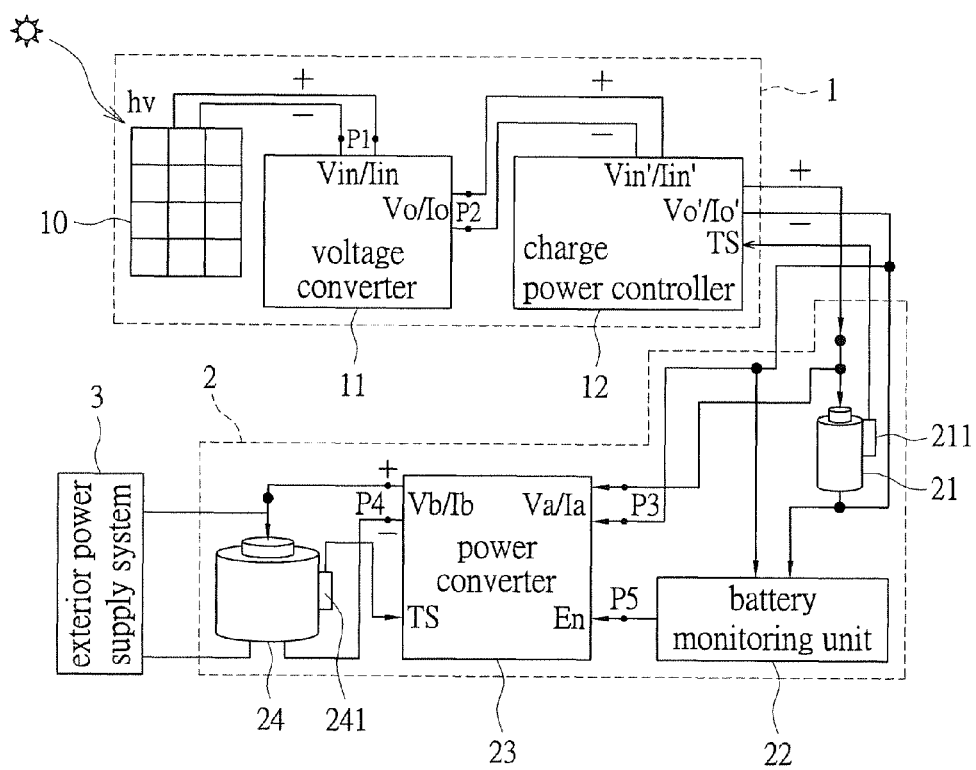
FIG. 1 shows a block diagram of an electricity storage device for a solar energy harvesting device according to an embodiment of the instant disclosure.

Please refer to FIG. 1 showing a block diagram of an electricity storage device for a solar energy harvesting device according to an embodiment of the instant disclosure. The solar energy harvesting device 1 comprises a solar energy receiving unit 10, a voltage converter 10 and a charge power controller 12. The solar energy receiving unit 10 usually is a solar panel with a plurality of solar cells. The solar energy harvesting device 1 transmits the electricity of the solar energy receiving unit 10 to at least an electricity storage unit 21. It is worth mentioning that one first electricity storage unit 21 and one second electricity storage unit 24 are drawn in FIG. 1. However, the numbers of the first electricity storage unit 21 and the second electricity storage unit 24 may be plural. The numbers of the first electricity storage unit 21 and the second electricity storage unit 24 are not so restricted.

The voltage converter 11 may be a boost converter or a buck converter. The voltage converter 11 has an input terminal P1 and an output terminal P2. The input terminal P1 of the voltage converter 11 is coupled to the solar energy receiving unit 10, and the voltage converter 11 receives the electricity of the solar energy receiving unit 10 by the input terminal P1. The solar energy receiving unit 10 provides input voltage Vin and input current Iin to the voltage converter 11. The charge power controller 12 is coupled to the output terminal P2 of the voltage converter 11, and the charge power controller 12 generates a charge voltage Vo' and a charge current Io' to charge at least one first electricity storage unit 21.

The electricity storage device 2 for the solar energy harvesting device 1 comprises at least a first electricity storage unit 21, at least a second electricity storage unit 24, a battery monitoring unit 22 and a power converter 23. The first electricity storage unit 21 receives and storage electricity from the solar energy harvesting device 1. The second electricity storage unit 24 is for coupling to an exterior power supply system 3, wherein the exterior power supply system 3 charges/discharges the second electricity storage unit 24 in a predetermined voltage. The exterior power supply system 3 may be a USB (Universal Serial Bus) charging/discharging circuit providing a constant voltage 5V for charging/discharging. The exterior power supply system 3 usually operates in a constant voltage, thus the charging/discharging of the second electricity storage unit 24 should comply with the operating condition and the operating voltage of the exterior power supply system 3. Usually, the first electricity storage unit 21 and the second electricity storage unit 24 are secondary batteries, such as lithium nickel batteries or lithium-ion batteries, but the instant disclosure is not so restricted.

The capacity of the second electricity storage unit 24 may be larger than the capacity of the first electricity storage unit 21, but the instant disclosure is not restricted thereto. The large capacity of the second electricity storage unit 24 may provide large output power of the large load, and storage more electricity. In general, the purpose of providing the second electricity storage unit 24 whose capacity is larger than the capacity of the first electricity storage unit 21 is described in the following. The first electricity storage unit 21 receives electricity of the solar energy with unstable charging Vo' and unstable charging current Io', thus the charging/discharging of the first electricity storage unit 21 happens frequently. When the capacity of the first electricity storage unit 21 is too large, the charge efficiency for the first electricity storage unit 21 under lower charging voltage Vo' and charging current Io' would be poor, and it is easily to shorten the life-time of the first electricity storage unit 21. On the contrary, when the capacity of the first electricity storage unit 21 is smaller, the cost of the utilized battery could be saved. On the other hand, the capacity of the second electricity storage unit 24 could have a larger capacity, because the discharge voltage of the first electricity storage unit 21 could be configured to a predetermined range due to the control over the power converter 23 govern by the battery monitoring unit 22; meanwhile, the second electricity storage unit 24 could be commonly connected to the exterior power supply system 3 for providing power or being charged.

The battery monitoring unit 22 is coupled to the first electricity storage unit 21. The battery monitoring unit 22 senses an output voltage Vbat1 of the first electricity storage unit 21, and generates a control signal (which is the enabling signal En shown in FIG. 1) according to the output voltage Vbat1 of the first electricity storage unit 21.

The power converter 23 has an input terminal P3 and an output terminal P4. The input terminal P3 is coupled to the first electricity storage unit 21, and the output terminal P4 is coupled to the second electricity storage unit 24. The power converter 23 may be a boost converter or a buck converter, but the type of the power converter 23 is not so restricted. The power converter 23 can be determined arbitrarily as needed. The power converter 23 is controlled by the control signal (which is the enabling signal En shown in FIG. 1) for converting the electricity of the first electricity storage unit 21 to the second electricity storage unit 24. The battery monitoring unit 22 enables the power converter 23 through the control signal when the output voltage Vbat1 of the first electricity storage unit 21 is larger than a start voltage V1 (shown in FIG. 3), for controlling the power converter 23 to convert the electricity of the first electricity storage unit 21 to the second electricity storage unit 24. The battery monitoring unit 22 disables the power converter 23 through the control signal when the output voltage Vbat1 of the first electricity storage unit 21 is less than a stop voltage V2 (shown in FIG. 3), wherein the start voltage V1 is larger than the stop voltage V2.

It is worth mentioning that the first electricity storage unit 21 and the second electricity storage unit 21 have temperature sensory devices 211 and 241 respectively. The temperature sensory device 211 senses the temperature of the first electricity storage unit 21 and provides the temperature sensing signal TS to the charge power controller 12. The temperature sensory device 241 senses the temperature of the second electricity storage unit 24 and provides the temperature sensing signal TS to the power converter 23. The power converter 23 may comprises at least one of an over-voltage protection circuit, an over-current protection circuit, a short protection circuit and an over-temperature protection circuit. The power converter 23 not only monitors the temperature of the second electricity storage unit 24, but also maintains the safety when the second electricity storage unit 24 is charged. Also, the charge power controller 12 maintains the safety when the first electricity storage unit 21 is charged. An artisan of ordinary skill in the art will appreciate how to implement the over-voltage protection circuit, the over-current protection circuit, the short protection circuit and the over-temperature protection circuit, thus there is no need to go into detail.

The electricity storage device 2 of this embodiment could convert electricity from the first electricity storage unit 21 to the second electricity storage unit 24. The second electricity storage unit 24 is for main electricity storage. The second electricity storage unit 24 is used on electric energy storage from solar cells, city grid supplied or other electric power generation systems. Since the second electricity storage unit 24 has its own existed charge/discharge controller (not shown in the figure), the charge condition is restricted and confined by the existed power delivery systems (city grid supplied or other electric power generation systems). And, usually capacity of the second electricity storage unit 24 is larger than capacity of the first electricity storage unit 21, hence it is hard to do charge sharing. This instant disclosure is to use the harvesting solar energy stored on a smaller battery which is the first electricity storage unit 21, and then boost/buck transfer the harvested solar energy into a larger main power load/ store battery which is the second electricity storage unit 24. By this instant disclosure no matter what smaller solar energy can be harvested and delivered into the second electricity storage unit 24 representing main battery function if the harvesting power is larger than the quiescent power consumption of the stages of boost/buck (voltage converter 11) and charge power controller 12. In this embodiment, the energy transfer from the first electricity storage unit 21 to the second electricity storage unit 24 is not happened automatically due to the co-existed of different power delivery systems (the exterior power supply system 3 shown in FIG. 1) of the second electricity storage unit 24. Hence the power converter 23 is employed between the first electricity storage unit 21 and the second electricity storage unit 24 for energy transfer. The combination of monitoring, loading control and boost/buck stage for the energy transfer can be achieved for different capacity levels and types of the first electricity storage unit 21 and the second electricity storage unit 24.

Figure 2:
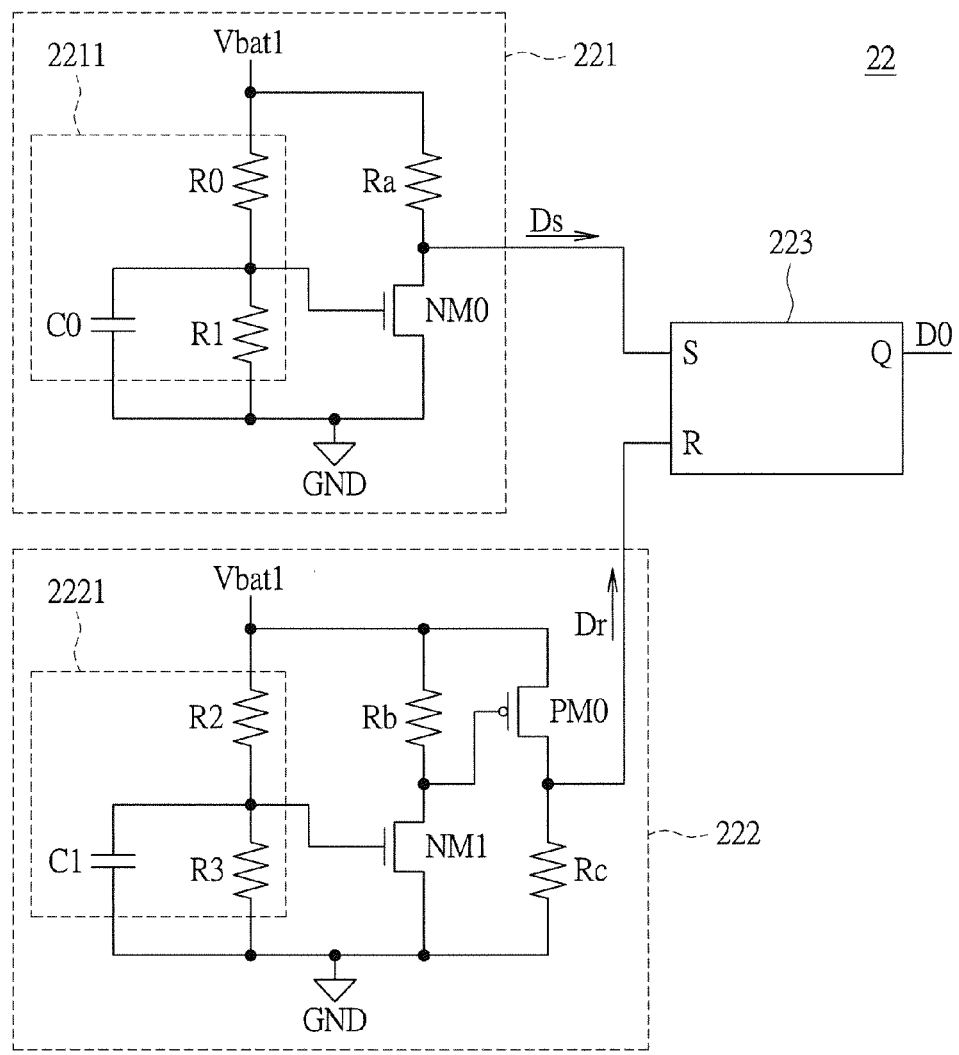
FIG. 2 shows a circuit diagram of a battery monitoring unit according to an embodiment of the instant disclosure.

Please refer to FIG. 1 in conjunction with FIG. 2, FIG. 2 shows a circuit diagram of a battery monitoring unit according to an embodiment of the instant disclosure. The battery monitoring unit 22 comprises a start circuit 221, a stop circuit 222 and a latch 223. The start circuit 221 receives the output voltage Vbat1 of the first electricity storage unit 21, wherein the start circuit 221 generates a start signal Ds when the output voltage Vbat1 is larger than the start voltage V1. The stop circuit 222 receives the output voltage Vbat1 of the first electricity storage unit 21, wherein the stop circuit 222 generates a stop signal Dr when the output voltage Vbat1 is less than the stop voltage V2. The latch 223 has a setting terminal S and a resetting terminal R. The setting terminal S receives the start signal Ds. The resetting terminal R receives the stop signal Dr. The latch 223 generates the control signal D0 according to the start signal Ds and the stop signal Dr.

Referring to FIG. 2 again. The start circuit 221 comprises an N-channel transistor, a biasing resistive element Ra and a voltage divider 2211. A first terminal of the N-channel transistor NM0 is coupled to the setting terminal S of the latch 223. A second terminal of the N-channel transistor NM0 is coupled to a grounding terminal GND, wherein the voltage level of the first terminal of the N-channel transistor NM0 is the start signal Ds. The biasing resistive element Ra is coupled between the first terminal of the N-channel transistor NM0 and the output voltage Vbat1 of the first electricity storage unit 21. The voltage divider 2211 converts the output voltage Vbat1 of the first electricity storage unit 21 to a control voltage (which is the gate voltage of the N-channel transistor NM0), and providing the control voltage to a control terminal (gate electrode) of the N-channel transistor NM0.

In one embodiment, the voltage divider 2211 may comprise a resistive element R0, a resistive element R1 and a decoupling capacitive element C0. The resistive element R0 is coupled between the output voltage Vbat1 of the first electricity storage unit 21 and the control terminal (gate electrode) of the N-channel transistor NM0. The second resistive element R1 is coupled between the control terminal (gate electrode) of the N-channel transistor NM0 and the grounding terminal GND. The decoupling capacitive element C0 is connected to the resistive element R1 in parallel.

Referring to FIG. 2 again. The stop circuit 222 comprises a P-channel transistor PM0, a biasing resistive element Rc, an N-channel transistor NM1, a biasing resistive element Rb and a voltage divider 2221. A first terminal of the P-channel transistor PM0 is coupled to the output voltage Vbat1 of the first electricity storage unit 21. The second terminal of the P-channel transistor PM0 is coupled to the resetting terminal R of the latch 223, wherein the voltage level of the second terminal of the P-channel transistor PM0 is the stop signal Dr. The biasing resistive element Rc is coupled between the second terminal of the P-channel transistor PM0 and the grounding terminal GND. A first terminal of the N-channel transistor NM1 is coupled to the control terminal (gate electrode) of the P-channel transistor PM0. A second terminal of the N-channel transistor NM1 is coupled to the grounding terminal GND. The biasing resistive element Rb is coupled between the first terminal of the N-channel transistor NM1 and the output voltage Vbat1 of the first electricity storage unit 21. The voltage divider 2221 converts the output voltage Vbat1 of the first electricity storage unit 21 to a control voltage (gate voltage of the N-channel transistor NM1), and provides the control voltage to a control terminal (gate electrode) of the N-channel transistor NM1. The voltage divider 2221 may comprise a resistive element R2, a resistive element R3 and a decoupling capacitive element C1. The resistive element R2 is coupled between the output voltage Vbat1 of the first electricity storage unit 21 and the control terminal (gate electrode) of the N-channel transistor NM1. The resistive element R3 is coupled between the control terminal (gate electrode) of the N-channel transistor NM1 and the grounding terminal GND. The decoupling capacitive element C1 is connected to the resistive element R3 in parallel.

In other words, the circuit in FIG. 2 is implemented by three active CMOS devices, seven resistors, two decoupling capacitors, and one latch. The resistive element R0 and the resistive element R1 divide the voltage Vbat1 to obtain the voltage of Vbat1*R1/(R0+R1) which could be configured as the start voltage V1 for starting the energy transfer from the first electricity storage unit 21 to the second electricity storage unit 24. The resistive element R2 and the resistive element R3 divide the voltage Vbat1 to obtain the voltage of Vbat1*R3/(R2+R3) which could be configured as the stop voltage V2 to stop the energy transfer from the first electricity storage unit 21 to the second electricity storage unit 24. The start voltage V1 and the stop voltage V2 act as the hysteresis control of the smooth charge and energy transfer from the first electricity storage unit 21 to the second electricity storage unit 24.

The battery monitoring unit 22 comprises three parts which are the start circuit 221, the stop circuit 222 and the latch 223. The latch 223 is used to latch the start voltage and the stop voltage corresponding to the output voltage Vbat1 to have the hysteresis function. It is a simple and effective design to deal with large range fluctuation of the voltage Vbat1 of the battery (the voltage of the first electricity storage unit 21 varies due to amount of the stored energy). The start signal Ds of the start circuit 221 and the stop signal Dr of the stop circuit 222 are respectively used to set and reset the latch's output D0, in order to enable or disable the power converter 23, thus the energy transfer between the first electricity storage unit 21 and the second electricity storage unit 24 could be controlled. If the capacity and condition is suitable for energy conversion and transfer for the first electricity storage unit 21, the power converter 23 transfers the energy (from the first electricity storage unit 21) into the second electricity storage unit 24 accommodating to existing power supply system until the first electricity storage unit 21 is drained to low battery. Furthermore, because the battery monitoring unit 22 comprises the start circuit 221 and the stop circuit 222, the start circuit 221 and the stop circuit 222 could be replaced by the analog comparators of the integrated circuits when considering the process shift, the temperature variation, and the voltage fluctuations of the power source in applications of semiconductor integrated circuit. Meanwhile, the reference voltage level of the input terminal of the analog comparator could be provided by the energy gap voltage (VBG) commonly used in semiconductor integrated circuit, and another input of the analog comparator is a dividing voltage (obtained by a divider resistor string) of the detected voltage level of the first electricity storage unit 21.

Figure 3:
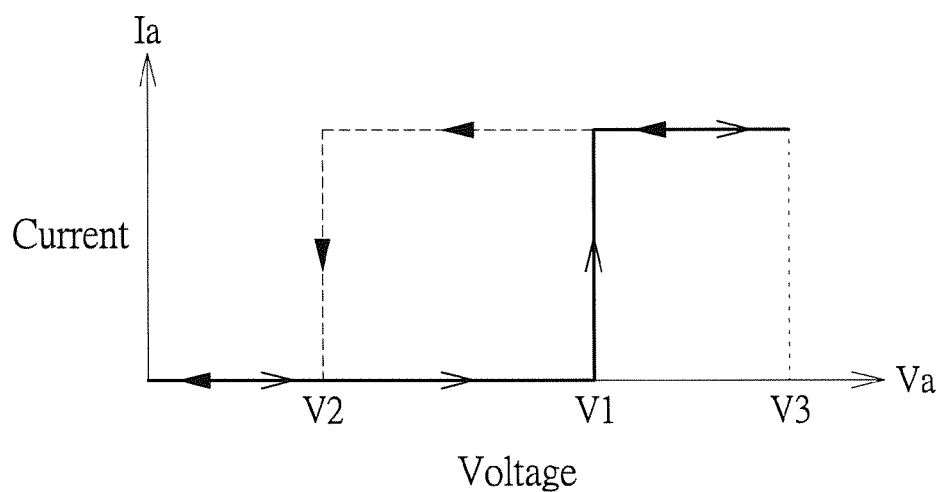
FIG. 3 shows a curve diagram of a battery monitoring unit controlling the charge/discharge of the first electricity storage unit according to an embodiment of the instant disclosure.

Please refer to FIG. 2 in conjunction with FIG. 3, FIG. 3 shows a curve diagram of a battery monitoring unit controlling the charge/discharge of the first electricity storage unit according to an embodiment of the instant disclosure. The start voltage V1 and the stop voltage V2 shown in FIG. 3 represent the charging/discharging voltage range of the first electricity storage unit 21. For example, the charging/discharging voltage of the lithium nickel battery is between 2.6 volt and 4.2 volt. The charging/discharging voltage of the lithium-ion battery is between 2.0 volt and 3.3 volt. The battery monitoring unit 22 could continuously monitor the voltage Vbat1 of the first electricity storage unit 21. When the voltage Vbat1 of the first electricity storage unit 21 is less than the stop voltage V2, does not discharge the first electricity storage unit 21. For example, when the first electricity storage unit 21 is lithium nickel battery, the stop voltage V2 could be set to about 2.6 Volt for avoiding over-discharging the battery. The battery monitoring unit 22 continuously monitors the voltage Vbat1 of the first electricity storage unit 21 until the voltage Vbat1 of the first electricity storage unit 21 is larger than the start voltage V1, then the battery monitoring unit 22 controls the power converter 23 to convert the electricity of the first electricity storage unit 21 to the second electricity storage unit 24. For example, when the first electricity storage unit 21 is lithium nickel battery, the start voltage V1 could be set to less than 4.2 volt. Additionally, the first electricity storage unit 21 could also be charged by the solar energy harvesting device 1, thus the first electricity storage unit 21 could be full charged and the electricity of the first electricity storage unit 21 could be increased. The voltage V3 shown in FIG. 3 is the voltage when the first electricity storage unit 21 is full charged. In short, when the voltage Vbat1 of the first electricity storage unit 21 is larger than the start voltage V1, the first electricity storage unit 21 starts to discharge until the voltage Vbat1 of the first electricity storage unit 21 is less than the stop voltage V2 again, then the first electricity storage unit 21 stops discharging. The charge/discharge process shown in FIG. 3 forms a hysteresis curve.

According to above descriptions, the electricity storage device for the solar energy harvesting device senses and determines the output voltage of the first electricity storage unit in order to control whether to charge the second electricity storage unit. The second electricity storage unit could be connected to the exterior power supply system. For the exterior power supply system, the operation of the second electricity storage unit is not affected. The electricity coming from solar energy could be stored in the first electricity storage unit and be charged to the second electricity storage unit in different charging voltage. Therefore, without changing the circuit of the exist power supply system, the load drive capability of the second electricity storage unit could be used well, and the cooperated first electricity storage unit with smaller capacity could extend the battery life in the second electricity storage unit, in order to save the related cost of the battery.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An electricity storage device for a solar energy harvesting device:
    at least a first electricity storage unit, receiving and storing electricity from the solar energy harvesting device;
    at least a second electricity storage unit, for coupling to an exterior power supply system, wherein the exterior power supply system charges/discharges the second electricity storage unit in a predetermined voltage;
    a battery monitoring unit, coupled to the first electricity storage unit, sensing an output voltage of the first electricity storage unit, and generating a control signal according to the output voltage of the first electricity storage unit; and
    a power converter, having an input terminal and an output terminal, wherein the input terminal is coupled to the first electricity storage unit, the output terminal is coupled to the second electricity storage unit, the power converter is controlled by the control signal for converting the electricity of the first electricity storage unit to the second electricity storage unit;
    wherein the battery monitoring unit enables the power converter through the control signal when the output voltage of the first electricity storage unit is larger than a start voltage, for controlling the power converter to convert the electricity of the first electricity storage unit to the second electricity storage unit;
    wherein the battery monitoring unit disables the power converter through the control signal when the output voltage of the first electricity storage unit is less than a stop voltage, wherein the start voltage is larger than the stop voltage.

2. The electricity storage device according to claim 1, wherein the battery monitoring unit comprises:
    a start circuit, receiving the output voltage of the first electricity storage unit, wherein the start circuit generates a start signal when the output voltage is larger than the start voltage;
    a stop circuit, receiving the output voltage of the first electricity storage unit, wherein the stop circuit generates a stop signal when the output voltage is less than the stop voltage; and
    a latch having a setting terminal and a resetting terminal, the setting terminal receiving the start signal, the resetting terminal receiving the stop signal, the latch generating the control signal according to the start signal and the stop signal.

3. The electricity storage device according to claim 2, wherein the start circuit comprises:
    an N-channel transistor, a first terminal of the N-channel transistor being coupled to the setting terminal of the latch, a second terminal of the N-channel transistor being coupled to a grounding terminal, wherein the voltage level of the first terminal of the N-channel transistor is the start signal;
    a biasing resistive element, coupled between the first terminal of the N-channel transistor and the output voltage of the first electricity storage unit; and
    a voltage divider, converting the output voltage of the first electricity storage unit to a control voltage, and providing the control voltage to a control terminal of the N-channel transistor.

4. The electricity storage device according to claim 3, wherein the voltage divider comprises a first resistive element, a second resistive element and a decoupling capacitive element, the first resistive element is coupled between the output voltage of the first electricity storage unit and the control terminal of the N-channel transistor, the second resistive element is coupled between the control terminal of the N-channel transistor and the grounding terminal, the decoupling capacitive element is connected to the second resistive element in parallel.

5. The electricity storage device according to claim 2, wherein the stop circuit comprises:
- a P-channel transistor, a first terminal of the P-channel transistor being coupled to the output voltage of the first electricity storage unit, a second terminal of the P-channel transistor being coupled to the resetting terminal of the latch, wherein the voltage level of the second terminal of the P-channel transistor is the stop signal;
- a first biasing resistive element, coupled between the second terminal of the P-channel transistor and a grounding terminal;
- an N-channel transistor, a first terminal of the N-channel transistor being coupled to the control terminal of the P-channel transistor, a second terminal of the N-channel transistor being coupled to the grounding terminal;
- a second biasing resistive element, coupled between the first terminal of the N-channel transistor and the output voltage of the first electricity storage unit; and
- a voltage divider, converting the output voltage of the first electricity storage unit to a control voltage, and providing the control voltage to a control terminal of the N-channel transistor.

6. The electricity storage device according to claim 5, wherein the voltage divider comprises a first resistive element, a second resistive element and a decoupling capacitive element, the first resistive element is coupled between the output voltage of the first electricity storage unit and the control terminal of the N-channel transistor, the second resistive element is coupled between the control terminal of the N-channel transistor and the grounding terminal, the decoupling capacitive element is connected to the second resistive element in parallel.

7. The electricity storage device according to claim 1, wherein the first electricity storage unit and the second electricity storage unit are secondary batteries.

8. The electricity storage device according to claim 1, wherein the power converter is a boost converter or a buck converter.

9. The electricity storage device according to claim 1, wherein the capacity of the second electricity storage unit is larger than the capacity of the first electricity storage unit.

10. The electricity storage device according to claim 1, wherein the power converter comprises at least one of an over-voltage protection circuit, an over-current protection circuit, a short protection circuit and an over-temperature protection circuit.

* * * * *